United States Patent Office 2,707,055
Patented Apr. 26, 1955

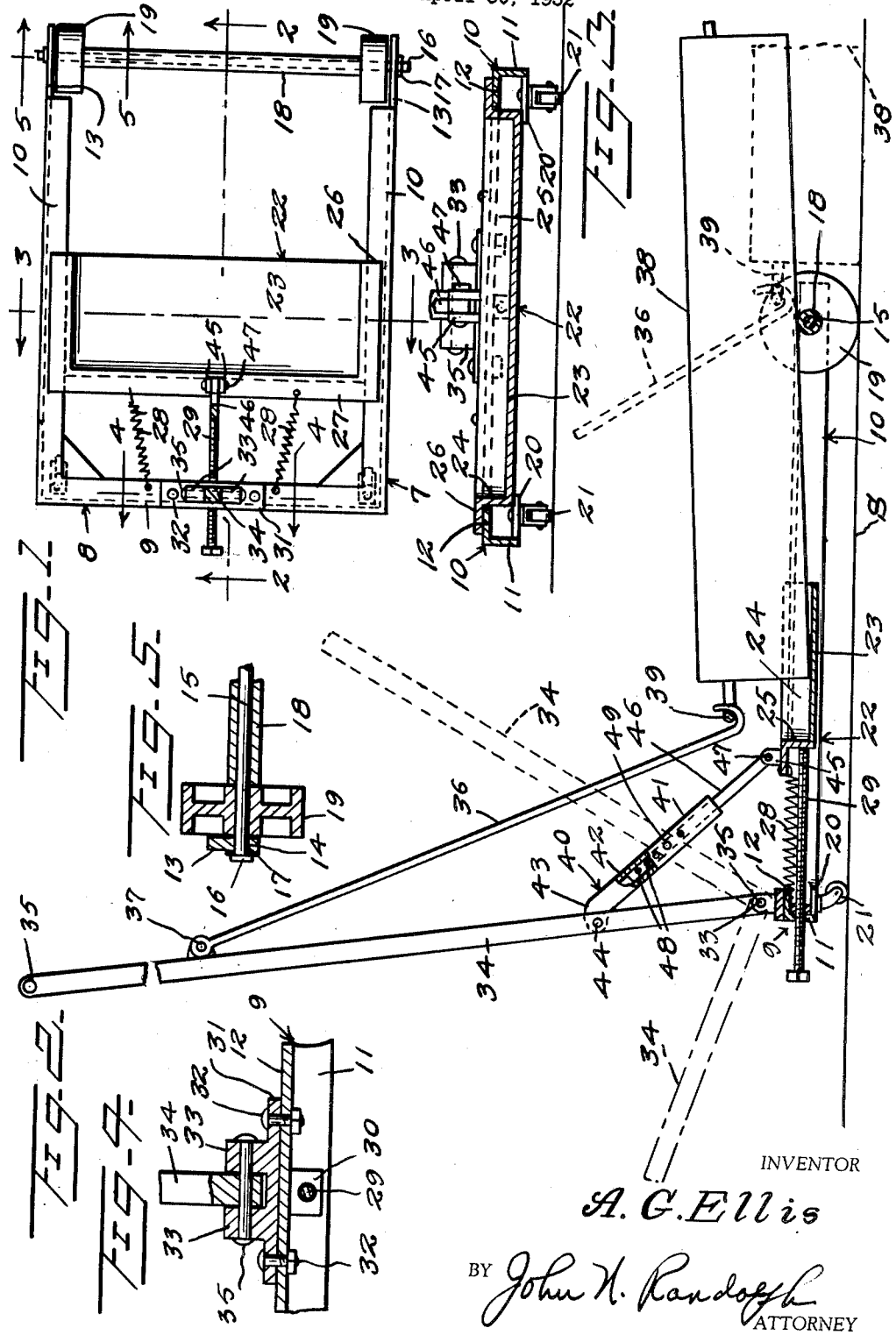

2,707,055

SELF-LOADING DOLLY

Archie G. Ellis, Buffalo, N. Y.

Application April 30, 1952, Serial No. 285,254

3 Claims. (Cl. 214—83.24)

This invention relates to a novel dolly for handling heavy objects such as tote pans or boxes and has for its primary object to provide a dolly of extremely simple construction by the use of which a heavy object may be readily moved to a loaded position on the dolly, and readily transported thereby and readily unloaded with a minimum of manual effort, thus enabling a single operator to handle and readily move objects or loads which would otherwise require two or more men for accomplishing the same operation without the use of the invention herein set forth.

More particularly, it is the primary object of the present invention to provide a dolly having novel means for readily effecting the loading and unloading of heavy objects with a minimum of manual effort.

A further object of the invention is to provide a dolly having a novel leverage means associated with the pulling tongue to reduce the amount of effort required to load the dolly.

A further object of the invention is to provide an adjustable load supporting member forming a part of the dolly whereby a load is supported on the dolly in nearly a balanced position to materially facilitate the unloading of the dolly.

Various other objects and advantages of the invention will hereinafter become more fully apparent from the following description of the drawing, illustrating a presently preferred embodiment thereof, and wherein:

Figure 1 is a plan view partly in section of the dolly;

Figure 2 is an enlarged longitudinal sectional view thereof taken substantially along a plane as indicated by the line 2—2 of Figure 1 and showing a load supported by the dolly;

Figure 3 is an enlarged cross sectional view taken substantially along a plane as indicated by the line 3—3 of Figure 1;

Figure 4 is an enlarged fragmentary cross sectional view taken substantially along a plane as indicated by the line 4—4 of Figure 1; and Figure 5 is a fragmentary cross sectional view on an enlarged scale, taken substantially along a plane as indicated by the line 5—5 of Figure 1.

Referring more specifically to the drawing, a novel dolly in its entirety is designated generally 7 and is preferably of openwork construction as illustrated including a substantially U-shaped frame, designated generally 8, having a transverse intermediate portion 9, constituting the front end of the dolly 7, and rearwardly extending transversely spaced substantially parallel sides 10 which are disposed at right angles to the front portion 9 and secured at their forward ends to the ends of said front portion or formed integral therewith. The front portion 9 and sides 10, as best illustrated in Figures 2 and 3, each include an outer depending vertical flange 11 and a horizontal top flange 12, which extends inwardly from the upper edge of the flange 11, formed by the angle iron construction of the frame 8. As best seen in Figure 1, the flanges 11 of the sides 10 extend rearwardly beyond the rear end of the top flanges 12 forming the rear flange portions 13 having aligned openings 14 therein.

An axle 15 extends across the rear end of the dolly 7 and has end portions extending through and journalled in the openings 14. The axle 15 preferably is provided with enlargements or stops 16 at the ends thereof and disposed outwardly of the flange portions 13 for retaining the axle ends in engagement with said flange portions. If desired, washers 17 may be mounted on the axle 15 between its enlarged ends 16 and the outer sides of the flange portions 13. A roller 18 is mounted on the intermediate portion of the axle 15 with its ends spaced from the flange portions 13. The roller 18 may be journalled on the axle 15 or secured thereto by a snug fitting engagement for rotation with the axle. A pair of wheels 19 for supporting the rear end of the dolly 7 are journalled on the axle 15 between the ends of the roller 18 and the flange portions 13. Wheels 19 are substantially larger in diameter than the roller 18. The axle 15, axle ends 16, roller 18 and wheels 19 function to maintain the sides 10 in substantially parallel relationship adjacent their rear ends and prevent the said sides from being displaced toward or away from one another. Corner plates 20 are suitably secured to the flanges 11 of the front portion 9 and sides 10 at the two front corners of the frame 8. A caster 21 is swivelly connected to and disposed beneath each front corner plate 20, said casters cooperating with the wheels 19 to provide the wheel support of the dolly 7.

A load rest, designated generally 22, is supported by the frame sides 10 and is longitudinally adjustable relatively to the frame 8. The load rest 22 comprises a substantially flat bottom 23 having upstanding side walls 24 and an upstanding front wall 25. The side walls 24 are provided with outturned flanges 26 at their upper ends and the front wall 25 has an outturned forwardly extending flange 27 at its upper end. As best illustrated in Figures 1 and 3, the walls 24 are disposed between the sides 10 and the flanges 26 thereof rest upon and slidably engage the top flanges 12 of the sides 10 for slidably supporting the load rest 22 for longitudinal movement in the frame 8. A pair of pull springs 28 are secured at their rear ends to the front flange 27 and at their forward ends to the flange 12 of the front portion 9 and normally urge the load rest 22 toward the forward end of the frame 8. A long adjusting screw 29 extends threadedly through the flange 11 of the front portion 9 and threadedly through a boss 30 which is secured to the inner side of said flange 11. The screw 29 has a headed forward end and extends rearwardly through the front portion 8, intermediate of the ends thereof and between the springs 28. The rear end of the screw 29 bears against the front wall 25 of the load rest 22 for limiting the extent that the load rest may be displaced forwardly by the springs 28 and for displacing the load rest rearwardly of the frame 8.

A plate 31 is secured to the top flange 12 of the front portion 9 by fastenings 32 and is provided with spaced upstanding apertured ears 33 which are disposed intermediate of the ends of said front portion 9. A relatively long handle 34 has a lower end disposed between the upstanding ears 33 and swingably connected thereto by a pivot pin 35, as best illustrated in Figure 4, for swinging movement of the handle 34 in a vertical plane and longitudinally of the dolly frame 8. The handle 34 is preferably considerably longer than the frame 8 and is provided at its outer or upper end with a crosspiece 35 forming a handgrip. A hook 36 has a shank end which is pivotally connected at 37 to the handle 34 at a distance from the pivot 35, preferably approximately equal to the length of the frame 8. The hook 36 is of approximately the same length as the portion of the handle between the pivot 35 and pivot 37 and is supported for swinging movement relatively to the handle 34 in substantially a vertical plane and behind said handle.

For the purpose of illustrating one use of the dolly 7, an elongated tote pan 38 is illustrated in Figure 3 and is shown provided with handles 39 at the ends thereof. Assuming that the pan 38 is resting on a floor or other supporting surface 40, as illustrated in dotted lines in Figure 3, and contains a relatively heavy load, the operator by manipulation of the handle 34 can back the dolly 7 to a position adjacent one end of the pan or load 38. In this position as illustrated in Figure 3, relatively to the dotted line position of the pan or load 38, the handle 34 is swung rearwardly of the frame 8 so that the hook 36 can engage the load handle 39, located adjacent the dolly 7, as illustrated in dotted lines in Figure 2. The handle 34 is then swung forwardly of the dolly 7. This will initially cause the dolly 7 to roll rearwardly until the roller 18 strikes the end of the load 38 disposed adjacent the dolly. Further forward swinging movement of the handle 34 will cause the hook 36 to exert a lifting pull on said end of the load 38. The aforementioned end of the pan or load 38 will ride up the roller 18 and the bottom of the load or pan will then move into position on the roller 18. Further forward swinging movement of the handle 34 will cause the pan to move forwardly on the dolly 7 with its bottom riding on the roller 18 or, more usually, will cause the dolly 7 to be displaced rearwardly under the bottom of the pan 38 with the roller 18 riding under said pan bottom. As the roller 18 moves slightly past a position intermediate of the ends of the pan or load 38, the balance of the weight of the pan or load will be disposed forwardly of the roller 18 thereby causing the forward end of the pan or load to swing downwardly about the roller 18 as a fulcrum. The load rest 22 will have been previously adjusted so that the forward end of the pan or load when it swings downwardly will come to rest on the load rest bottom 23, as illustrated in Figure 2.

The handle 34 is then swung rearwardly sufficiently to disengage the hook 36 from the handle 39, after which the handle 34 may be swung forwardly to a convenient forwardly extending position for pulling the dolly bearing the load 38, as illustrated by the forward dotted line position of the handle 34 in Figure 2. When the load 38 is moved to its desired destination on the dolly 7, the forward end of the dolly is lifted upwardly by the handle 34 to overbalance the load 38 so that its rear end will swing downwardly about the roller 18 as a fulcrum back to a position in engagement with the floor or surface S. The roller 18 will then roll beneath the bottom of the load 38 to and beyond its forward end thus displacing the dolly forwardly and out of engagement with the load. The dolly 7 is constructed so that it may be readily hung on a wall or other upright surface when not in use.

One manner of use of the dolly has been previously described. However, the dolly 7 is also equipped with an unloading unit, designated generally 40 and which may be employed with the handle 34 for unloading the pan or load 38 from the dolly 7 in lieu of lifting the forward end of the dolly, as previously described. The unit 40 includes a sleeve 41 having an open lower end and a head 42 closing the opposite, upper end of said sleeve and which is provided with a bifurcated extension 43, the terminal portions of the furcations of which straddle the handle 34 and are connected thereto by a pivot pin 44 for swingably connecting the tube 41 to the handle 34 near its pivot 35. The tube 41 is disposed on the inner or rear side of the handle 34, beneath the hook 36. The front flange 27 of the load rest is provided intermediate of its ends with a pair of spaced upstanding apertured ears 45 to loosely receive the lower end of a rod 46 which is pivotally connected to said ears by a pivot pin 47. The upper end of the rod 46 extends into the tube or sleeve 41. If desired, the tube or sleeve 41 may be provided with spaced openings 48 for selectively receiving a stop pin 49 to limit the extent that the rod 46 can be advanced into the sleeve 41 and so that said rod may be of such a length that it can be disengaged from the sleeve by swinging the handle 34 forwardly to adjacent its forward dotted line position of Figure 2.

The unloading unit 40 does not function in connection with loading the pan or load 38 on the dolly 7 and the rod 46 may be disengaged from the tube 41 for this operation or if engaged therewith, will force the load rest 22 rearwardly of the dolly as the handle 34 is swung toward its rearmost dotted line position of Figure 2 to engage the hook 36 with the handle 39 in the unloaded dotted line position of the pan 38 in Figure 2. The pan or load 38 is loaded on the dolly in the manner as previously described and if the rod 46 and tube 41 are engaged, the springs 28 will return the load rest 22 to its adjusted position of Figure 2 before the forward end of the pan or load 38 swings downwardly into engagement therewith.

When it is desired to unload the dolly 7, instead of lifting upwardly on the forward end of the dolly by the handle 34, the handle 34 is merely swung rearwardly toward its rearmost dotted line position of Figure 2 to cause the rod 46 to telescope into the tube 41 either into abutting engagement with the head 42 or adjustable stop 49, after which further rearward swinging movement of the handle 34 will cause the unloading attachment 40 to exert a rearward thrust against the load rest 22. As the load rest 22 is thus displaced rearwardly, the load 38 will roll on the roller 18 rearwardly of the dolly 7 until the preponderance of the weight of the load is behind the roller 18. When this occurs, the rear end of the load 38 will swing downwardly into engagement with the surface S and the dolly 7 will then be displaced forwardly or from right to left by the roller 18 rolling beneath the bottom of the load 38 to thus displace the dolly forwardly and out of engagement with the load, as previously described.

From the foregoing it will be readily apparent that a dolly of extremely simple construction has been provided which may be readily utilized for loading, conveying and unloading relatively heavy loads with a minimum of manual effort and which may be readily adjusted for supporting loads of different lengths in a transporting position.

Various modifications and changes are contemplated and may obviously be resorted to, without departing from the spirit or scope of the invention as hereinafter defined by the appended claims.

I claim as my invention:

1. A dolly of the character described comprising an elongated frame having an open rear end, wheels supporting said frame in an elevated position, a roller journalled in said frame adjacent the rear end thereof and transversely of said frame, a load rest mounted in said frame in front of the roller for sliding movement longitudinally of the frame, said load rest being adapted to support the forward end of a load, said roller being adapted to support the load at a point rearwardly of its balance point, and means for longitudinally adjusting the load rest relative to the dolly frame for accommodating loads of different lengths comprising pull springs connected to the load rest and to the forward end of the dolly frame for urging the load rest forwardly of the dolly, and a screw forming an adjustable stop extending threadedly through a forward end of the dolly frame and bearing against the load rest for displacing it rearwardly of the frame.

2. A dolly of the character described comprising an elongated frame having an open rear end, wheels supporting said frame in an elevated position, a roller journalled in said frame adjacent its rear end and disposed transversely thereof, a load rest mounted in said frame in front of the roller and adapted to support the forward end of a load, and said roller being adapted to support the load at a point rearwardly of the balance point of the load, a pulling handle having one end swingably connected to the forward end of the dolly for vertical swinging movement longitudinally of the dolly, and an unloading unit formed of telescopically connected sections, one of said sections being pivotally connected to the handle and the other section being pivotally connected to the load rest for displacing the load rest rearwardly when the handle is swung rearwardly to cause the load to be moved rearwardly until the preponderance of the weight of the load is disposed behind the roller.

3. A dolly of the character described comprising an elongated frame having an open rear end, wheels supporting said frame in an elevated position, a roller journalled in said frame adjacent its rear end and disposed transversely thereof, a load rest, and means slidably mounting the load rest in the frame in front of the roller for sliding movement longitudinally of the frame, said load rest including a bottom, an upstanding front wall and upstanding side walls combining to form an open rear end, said load rest bottom being disposed below the level of the uppermost part of the roller and being adapted to support the forward end of a load, said roller being adapted to support the load at a point rearwardly of the balance point of the load.

References Cited in the file of this patent

UNITED STATES PATENTS

| 272,106 | Watrous | Feb. 13, 1883 |
| 655,138 | Welch | July 31, 1900 |
| 1,537,156 | Baxter | May 12, 1925 |
| 1,706,253 | Raymond | Mar. 19, 1929 |
| 1,706,267 | Van de Mark et al. | Mar. 19, 1929 |
| 2,360,799 | Slingsby | Oct. 17, 1944 |
| 2,367,754 | Cole | Jan. 23, 1945 |
| 2,478,196 | Johnston et al. | Aug. 9, 1949 |
| 2,517,938 | Stevenson | Aug. 8, 1950 |
| 2,547,329 | Lapham | Apr. 3, 1951 |
| 2,633,260 | Sutherland | Mar. 31, 1953 |

FOREIGN PATENTS

| 112,582 | Sweden | Nov. 28, 1944 |